Figure 1:
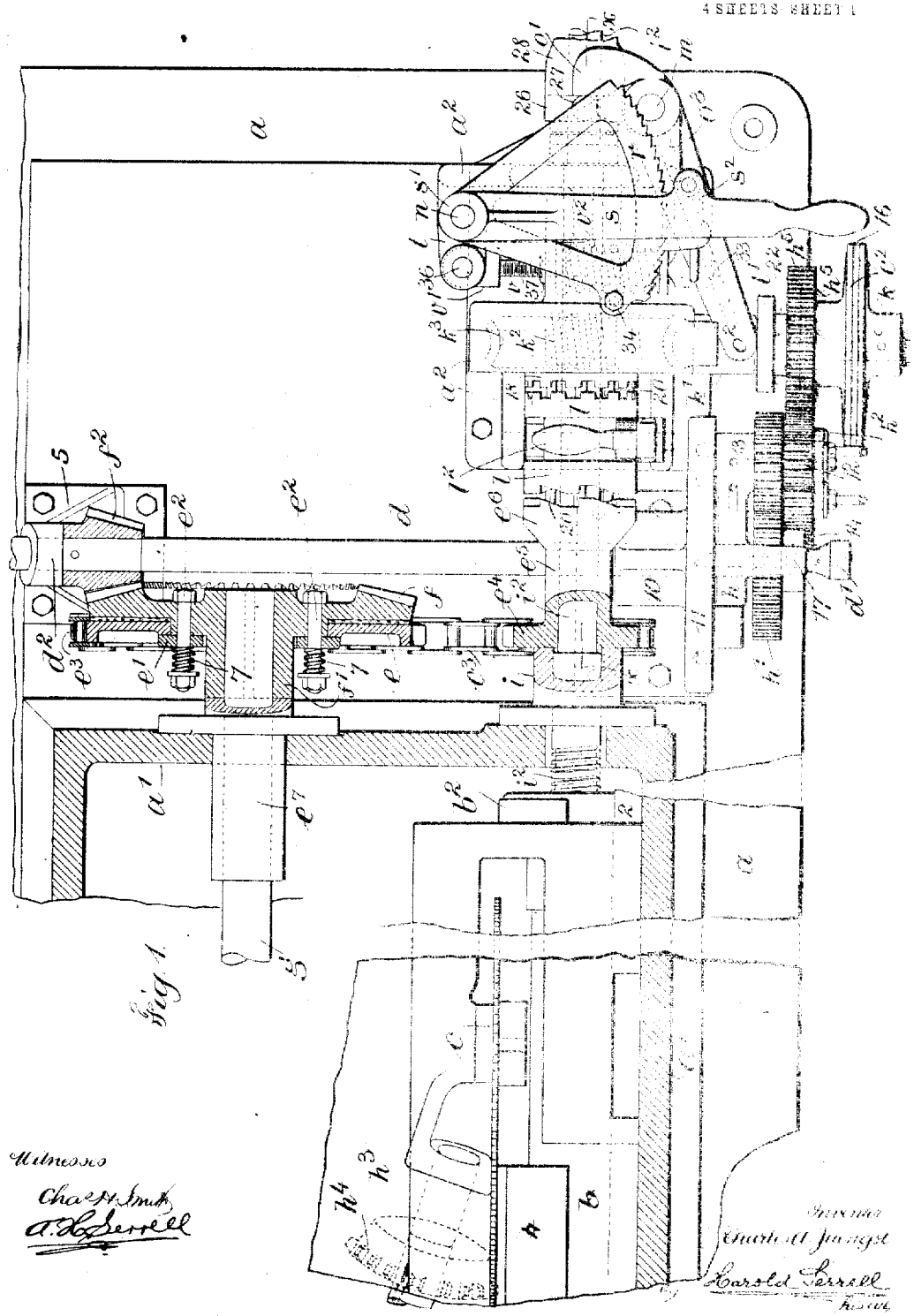

C. A. JUENGST.
METAL SAWING MACHINE.
APPLICATION FILED AUG. 9, 1910.

1,012,204.

Patented Dec. 19, 1911.
4 SHEETS—SHEET 1.

C. A. JUENGST.
METAL SAWING MACHINE.
APPLICATION FILED AUG. 9, 1910.
1,012,204.
Patented Dec. 19, 1911.
4 SHEETS—SHEET 2.
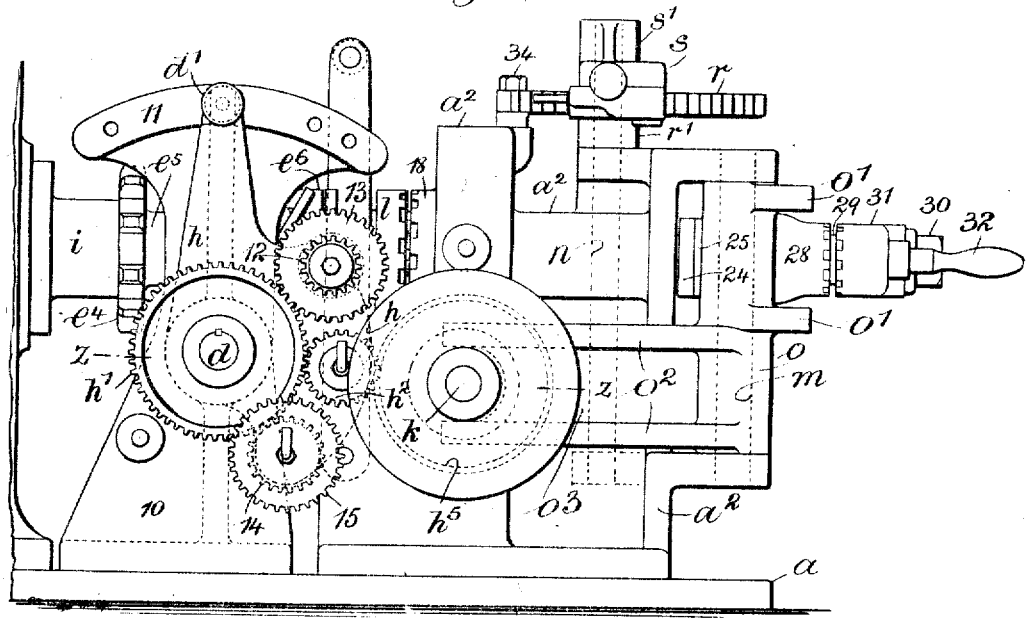
Fig. 2.
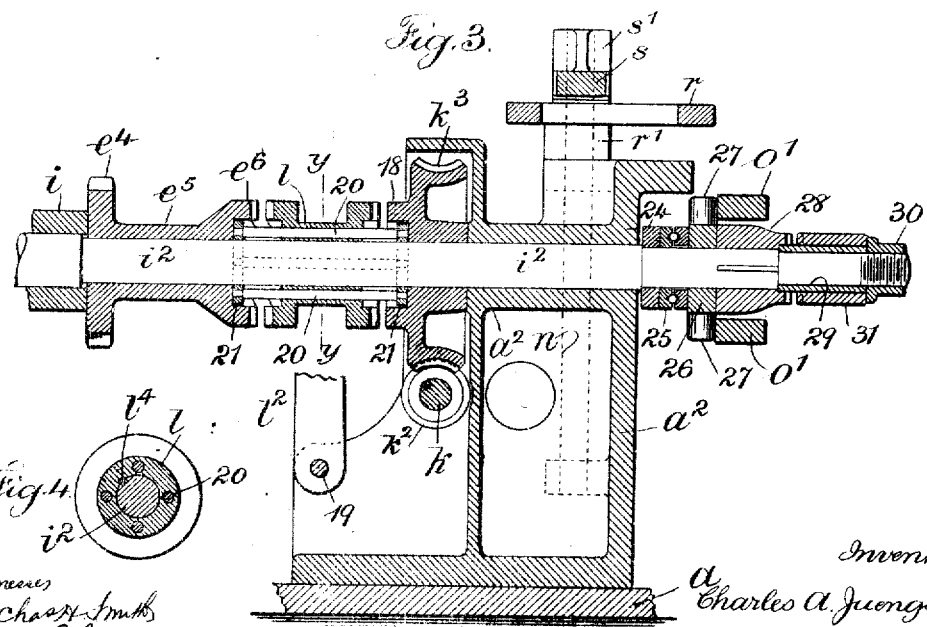
Fig. 3.
Fig. 4.
Witnesses
Chas. H. Smith
A. H. Serrell
Inventor
Charles A. Juengst
by Harold Serrell
his Atty.

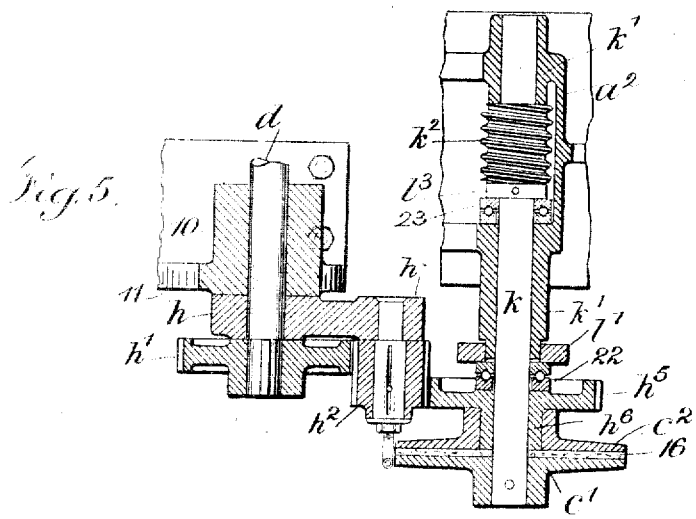
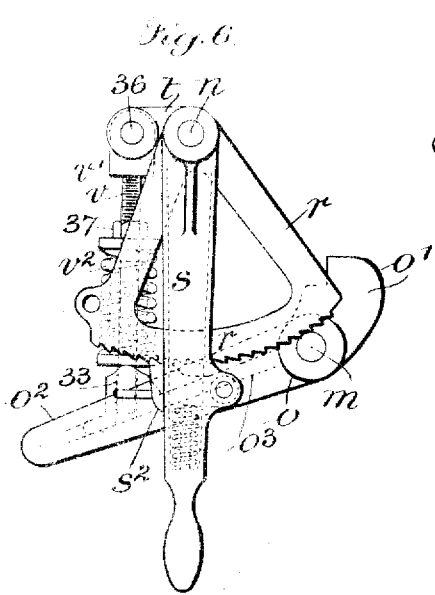
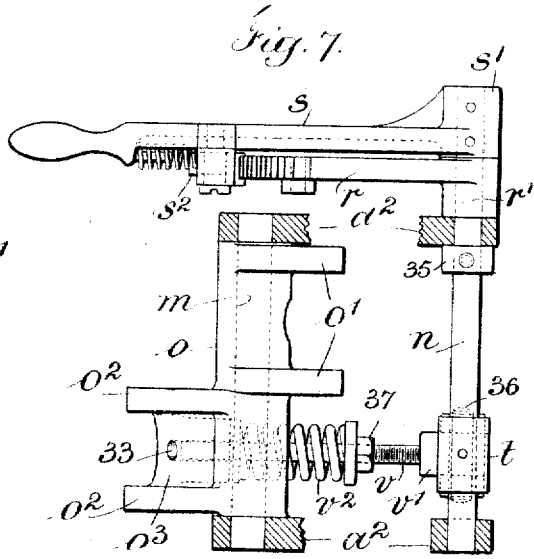

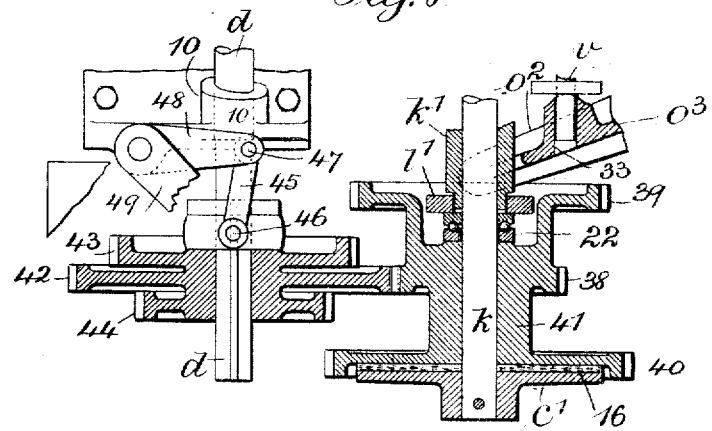
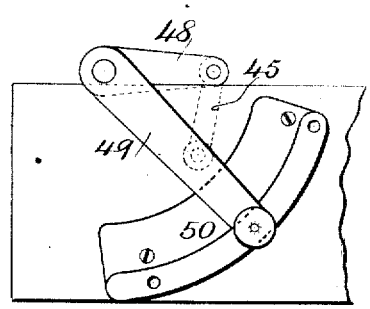
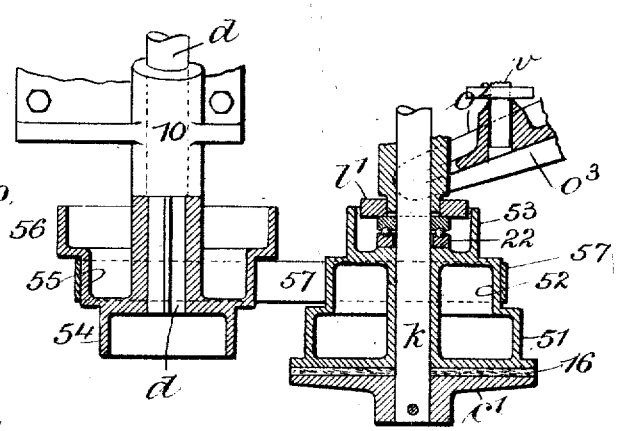

UNITED STATES PATENT OFFICE.

CHARLES A. JUENGST, OF CROTON FALLS, NEW YORK, ASSIGNOR TO HIGLEY MACHINE COMPANY, OF CROTON FALLS, NEW YORK, A CORPORATION OF NEW YORK.

METAL-SAWING MACHINE.

1,012,204.   Specification of Letters Patent.   Patented Dec. 19, 1911.

Application filed August 9, 1910. Serial No. 576,383.

*To all whom it may concern:*

Be it known that I, CHARLES A. JUENGST, a citizen of the United States, residing at Croton Falls, in the county of Westchester and State of New York, have invented an Improvement in Metal-Sawing Machines, of which the following is a specification.

My invention relates to the art of sawing articles of metal especially when the metal is in a cold state and the device embodying my invention is an improvement upon the structure shown and described in Letters Patent granted to me April 9, 1907, numbered 849,793.

The object of my invention is to simplify the devices of said patent, to make more positive and quick acting the automatically operating devices which yield for the disconnection of the feeding devices under excessive load and to readily, quickly and positively vary the speed of the saw through the work.

In carrying out my invention, I mount the saw on a carriage and I provide suitable means both for revolving the saw and for progressively feeding the saw and carriage along with the progress of the work. The work is mounted upon a table in and along which the saw and its carriage are moved. I provide means which when moved in one direction connect a screw feeding shaft and a co-acting series of revoluble devices between the power shaft through a series of adjustable devices and tension devices with the said screw feeding shaft and which means when moved in the opposite direction disconnect said parts and connect the screw feeding shaft with another and different set of parts continuously revoluble from the power shaft for feeding the saw and carriage in a reverse or backward direction for retracting the saw from the work, and which latter devices yield to prevent the reverse movement being too sudden, positive and quick acting. The tension devices I employ apply tension to transmit the power of the main shaft to the feed shaft to operate the saw and in connection with these tension devices I employ manually actuated devices for regulating and increasing or decreasing this applied tension according to the character of the work. These devices include parts adapted to yield under excessive load for the disconnection of the feeding devices for momentarily retarding or stopping the movement of the machine, all of which is hereinafter more particularly described.

In the drawings, Figure 1 is a plan and partial section representing the devices of my improved machine. Fig. 2 is an elevation of the devices shown at the right hand of Fig. 1 and which devices constitute the major portion of the devices of my invention. Fig. 3 is a vertical longitudinal section at about the dotted line $x\ x$ of Fig. 1 through the screw feed shaft. Fig. 4 is a cross section at about the dotted line $y, y,$ of Fig. 3. Fig. 5 is a horizontal section or sectional plan at about the dotted line $z, z,$ of Fig. 2. Fig. 6 is a plan of the manually actuated portion of the tension devices. Fig. 7 is a side elevation and partial section of said devices. Fig. 8 is a sectional plan showing a form of my invention which would be taken on an imaginary line which would be substantially the dotted line $z, z,$ of Fig. 2. Fig. 9 is an accompanying view to Fig. 8 showing more particularly the mechanism for shifting one of the series of yielding devices, and Fig. 10 is a sectional plan showing still a further form of my invention; the line of section being an imaginary line similar to the dotted line $z, z,$ of Fig. 2.

The bed $a$, the frame $a^1$ and the housing $a^2$ are all preferably of cast metal and of sufficient dimensions and strength to support the various operative parts related thereto and carried thereby and hereinafter described.

As in my patent hereinbefore referred to, the table is provided with an opening for placing the saw $c$ and the frame $a^1$ is provided with slide-ways 2 for a carriage composed of a body $b$ and suitable brackets, one of which $b^2$ is shown in Fig. 1 and there is an arbor thereon for the saw $c$ and guides 4 secured to the carriage and adapted to come against the saw. The carriage rest upon the slide-ways 2 and is movable thereon. A shaft $d$ extends transversely of the bed $a$ outside of the frame $a^1$. It is carried at one end upon a standard 5 having a bearing sleeve $d^2$ and at the other end upon a standard 10. A shaft $g$ which is the shaft of applied power, runs at right angles and in the same horizontal plane as the shaft $d$ through and lengthwise of the frame $a^1$ of the sawing machine. There is a bearing sleeve $e^7$ in the frame $a^1$ at one end of this shaft and on the end of the shaft $g$ is a bevel-wheel $f$ and this wheel $f$ gears into a bevel pinion $f^2$ upon the shaft $d$ and by this bevel pinion and bevel wheel the rotation and the power of the shaft $g$ are communicated to the shaft $d$. The rotation and the power that are needed for the rotation of the saw are communicated as shown and described in my aforesaid patent; Fig. 1 showing only so much as is necessary with this application, namely, the shaft $h^3$ and the sprocket $h^4$ which turn the saw; the connections thereto from the power shaft $g$ not being shown.

Referring especially to Fig. 1, the bevel wheel $f$ is provided with a hub $f^1$ upon the shaft $g$ and this bevel gear wheel $f$ is provided with a shoulder on which is mounted a sprocket $e$ and a washer comes between the juxtaposed faces of this bevel gear wheel $f$ and the sprocket $e$, and with these parts I provide a friction ring $e^1$ and a series of bolts $e^2$ which pass through the bevel wheel $f$ and through the friction ring $e^1$ with helical springs 7 around the projecting parts of these bolts and between the outer face of the friction ring $e^1$ and the end nuts. These latter may be screwed down to increase the tension of the springs 7 and bring the friction ring with more or less force against the back of the sprocket $e$ so as to increase the grip of said sprocket to the bevel gear wheel $f$. A chain $e^3$ passes around the friction held sprocket $e$ and also around a sprocket $e^4$ which is loose on the feed screw shaft $i^2$. This sprocket $e^4$ is made with a sleeve $e^5$ and on the opposite end of the sleeve from the sprocket is a clutch end $e^6$. These parts are free to turn about the screw shaft $i^2$ except as engaged as hereinafter described.

The devices just described have a yielding function, the object of which is to prevent the reverse movement or change of movement or direction from feed to return being too sudden, too positive and too quick acting, for these devices will yield and prevent jar or strain and all the parts will run in unison as soon as sufficient momentum has been attained.

$i$ represents a bearing sleeve for the screw feed shaft $i^2$ and which is secured to the frame $a^1$.

I prefer to form with the standard 10 a segment 11 on the upper end thereof which is provided with a series of holes in the outer face. The shaft $d$ not only passes through the standard 10 but through a rocker arm $h$ and through the hub of a large gear $h^1$ which is keyed thereto; therefore the rocker arm is free to move in a swinging relation upon the shaft $d$ between the hub of the gear $h^1$ and the face of the standard 10.

The upper end of the rocker arm $h$ is made tubular and serves the purpose of a handle for swinging the same, and through this tubular part or sleeve 17 passes a locking pin $d^1$ which may be threaded in the sleeve 17 or be spring-held. The function performed by the sleeve 17 and its locking pin movable therein is to locate the position of this rocker arm $h$ and the gear carried thereby; it being apparent from Figs. 1 and 2 that there are several openings in the outer surface of the segment 11 adapted to receive the inner end of this locking pin $d^1$ so as to suitably position the rocker arm $h$ and the parts carried thereby. On an arbor carried by this rocker arm $h$, I mount a small gear $h^2$ and this meshes with a large gear $h^5$ on a shaft $k$ mounted in a suitable bearing $k^1$ formed as a part of the housing $a^2$ of the machine. On arbors also connected to the rocker arm $h$ I provide the gears 12 13 above the gear $h^2$, and the gears 14 15 below the gear $h^2$. The gears 12 and 13 are connected as one on an arbor and they are placed above the gear $h^2$, and the gears 14 15 are connected together and on an arbor below the gear $h^2$. The gear 13, the gear 14 and the gear $h^2$ are always in mesh with the large gear $h^1$ and are constantly turning with this gear so long as the gear $h^1$ and the shaft $d$ are rotated. Fig. 2 shows the gear $h^2$ in mesh with the gear $h^5$ of the shaft $k$, but the rocker arm $h$ can be swung so as to bring the gear 12 in mesh with the gear $h^5$. This will carry the gear $h^2$ out of mesh. The rocker arm $h$ may also be swung in the opposite direction to carry the gear $h^2$ out of mesh with the gear $h^5$ and bring the gear 15 into mesh with the gear $h^5$. Considering the proportion of the gears 12 to 15 inclusive, it will be noticed that when the gear 12 is in mesh with the gear $h^5$ that the speed imparted to the gear $h^5$ will be considerably reduced even over the speed imparted thereto by the gear $h^2$ and also that when the gear 15 is brought into mesh with the gear $h^5$ that the speed imparted to the gear $h^5$ will be greatly increased, for the gear 15 is the larger of the transmission gears and the gear 12 the smaller and these gears are to be so proportioned as to impart speeds of one half inch, one inch, or one and one-half inch through the parts connected therewith and per minute through the screw feed shaft $i^2$ to the saw.

Referring now particularly to Fig. 5, it will be noticed that the gear $h^5$ is provided with a sleeve $h^6$; that these parts surround the shaft $k$. They are loose on said shaft so as to turn freely if there is no application of power to make them turn with the said shaft.

On the outer end of the shaft $k$ and pinned thereto is a disk $c^1$ with a hub; the hub portion being pinned to the shaft so as to turn therewith. There is also a disk $c^2$ in a plane parallel with the disk $c^1$; the disks being separated by a friction disk 16 of suitable material,—probably fiber or leather or some material different from the metal of the disks. The hub of the disk $c^2$ surrounds and agrees in its width with the hub or sleeve $h^6$ of the large gear $h^5$. Surrounding the shaft $k$ and coming next to the inner surface of the large gear $h^5$ are ball bearings 22 and coming next to the ball bearings and surrounding the reduced end of the bearing sleeve $k^1$ is a collar $l^1$. Mounted upon this shaft $k$ is a worm $k^2$ preferably formed integral with the collar $l^3$ pinned to the shaft $k$ and between this collar and the adjacent end of the bearing sleeve $k^1$ are ball bearings 23; the worm $k^2$, the collar $l^3$ and the ball bearings 23 filling the space between the opposite adjacent ends of the bearing sleeve $k^1$ so that these parts remove any possibility of lost motion or of movement end-wise of the shaft $k$, yet permit the same to turn in the bearing sleeve $k^1$.

Referring now particularly to Figs. 1 and 3, I provide a worm wheel $k^3$ on the screw feed shaft $i^2$ in mesh with the worm $k^2$ on the shaft $k$ and by reference to Fig. 3 it will be apparent that on the left hand face of the worm wheel $k^3$ there are clutch teeth 18 formed and that between the clutch teeth $e^6$ and 18 there is a sliding clutch $l$ which surrounds the screw feed shaft $i^2$. This is actuated by a lever $l^2$ pivoted at 19 to the housing $a^2$; said lever having suitable connection with the sliding clutch $l$ for the movement thereof.

I provide a spline or key $l^4$ (see Fig. 4) placed in the screw feed shaft $i^2$ and extending through the slide clutch $l$ and I further provide a cage consisting of four slide rods 20 and two collars 21; the collars surrounding the screw feed shaft $i^2$ and coming within the recesses of the clutch ends $e^6$ and 18 with the rods 20 held thereto and passing through the sliding clutch $l$. This cage member serves the purpose of separating the sleeve $e^5$ from the hub of the worm wheel $k^3$ and keeping these parts snugly and respectively against the bearing sleeve $i$ on the one hand and the housing $a^2$ on the other; also preventing any possible crowding or lack of free movement longitudinally of the screw shaft $i^2$ of the sliding clutch member.

When the lever $l^2$ is moved to the right hand of Fig. 1 engaging the clutch $l$ with the clutch teeth 18 and worm-wheel $k^3$, the power transmitted from the shaft $d$ through the train of gears (Fig. 2) to the shaft $k$ will be communicated to the shaft $i^2$ to feed the saw to and through the work. When after the saw has cut through the work it is desired to return the same to the place of beginning and start another cut, the lever $l^2$ is moved to the left hand of Fig. 1, engaging the clutch $l$ with the teeth of the clutch $e^6$ when the power of the chain $e^3$ upon the sleeve $e^5$ will be effective to turn the shaft $i^2$ in the reverse direction and feed back the saw and the saw carriage to their initial position ready to again be moved forward.

Near the right hand end of the screw feed shaft $i^2$ I provide a collar 24 against a shoulder of the shaft and next to this collar are ball bearings 25. A collar 26 surrounds the shaft next to the ball bearings 25 and said collar is provided with oppositely placed trunnions 27.

The extreme outer end of the screw feed shaft $i^2$ is reduced in diameter and is provided with a sleeve 29 which sets up against the shoulder of said shaft and is of greater thickness than the reduction of the shaft, and on the extreme end of the shaft there is a nut 30 which secured to the screw threaded end of the shaft holds the sleeve 29 firmly in position and forms a stop for the clutch member 31 which surrounds the sleeve 29.

A handle device 32 is provided (see Fig. 2) for moving the clutch member 31 into engagement with the clutch sleeve 28. This clutch sleeve comes between the collar 26 and the left hand end of the sleeve 29 and is keyed to the screw feed shaft $i^2$, and these parts while not comprising any portion of my present invention, are the same and perform the same function as described in my aforesaid Letters Patent.

I provide two upright parallel shafts $m$ and $n$ in the housing $a^2$ of the machine and a rocker member (see particularly Figs. 2 and 7). This rocker member comprises a tubular standard $o$, a pair of parallel arms $o^1$ extending off in one direction and another pair of parallel arms $o^2$ extending off in almost the opposite direction. There is a web $o^3$ between the arms $o^2$ with a hole 33 in this web. The ends of the arms $o^1$ are notched. The arms straddle the clutch 28 and bear upon the trunnions 27 (see Fig. 3). The free ends of the arms $o^2$ straddle the bearing sleeve $k^1$ of the shaft $k$ and bear upon the opposite rear faces of the collar $l^1$ with considerable force.

I provide a sector $r$ formed with a toothed periphery or edge and this sector has a hub $r^1$ mounted upon the shaft $n$; the sector in turn being secured by a bolt or pin 34 to an arm of the housing $a^2$ so that the sector is held firmly and immovable.

There is a collar 35 upon the shaft $n$ coming below the upper member of the housing $a^2$ and at the other side of the housing from the hub $r^1$ I provide a lever arm $s$ having a hub $s^1$ mounted upon the shaft $n$ directly above the hub $r^1$ and this hub $s^1$ is pinned securely to the shaft $n$. This lever arm $s$ carries a spring actuated pawl $s^2$ secured to its under side and the two teeth with which this pawl is preferably formed come into engagement with the teeth upon the edge of the sector $r$ so as to hold the lever in the desired position, and govern the applied tension.

I provide an arm and hub $t$ securely pinned near the lower end of the shaft $n$ and the free end of this arm is connected by a pivot pin 36 to the head $v^1$ of a screw threaded rod $v$; the free end of this rod $v$ passing into the hole 33 in the web $o^3$, and around the rod $v$ between a nut and washer 37 thereon and the face of the web $o^3$ I provide a helical spring $v^2$. It is preferable to form the web $o^3$ at the hole 33 as a boss so that there is an appreciable length of bearing for the free end of the rod $v$ and by means of the nut 37 initial tension is applied to the spring $v^2$.

Referring particularly to Figs. 6 and 7, it will be noticed that a movement of the lever $s$ to the right hand of Fig. 6 will swing the shaft $n$, the arm $t$, and move the rod $v$ and the spring against the web $o^3$ between the arms $o^2$, forcing the free ends of these arms $o^2$ against the collar $l^1$; the tendency thus produced being to move the collar $l^1$, the ball bearings 22, the gear $h^5$, with its sleeve and the disk $c^2$ with force against the friction disk 16 so as to compel the disk $c^1$ and the shaft $k$ to turn with and by virtue of the turning movement of the gear $h^5$ produced by the small gear $h$ or in turn by the gears 12, 13, or 14, 15, from the main gear $h^1$ on the shaft $d$.

In the operation of the machine and as hereinbefoi indicated, the screw feed shaft $i^2$ may be moved longitudinally and toward the right of Fig. 3, and it will be apparent that such a movement is possible because within the bearing sleeve $i$ the screw feed shaft $i^2$ is shouldered and there is a space indicated at the left hand of Fig. 3 within this sleeve and between the shoulder of the shaft and the sprocket $e^4$ indicating the possibility of this movement.

In the operation of the machine, should the saw strike a hard part of the metal through which it is difficult to make progress, there would be a backward or back-lash motion of the feed shaft. This would cause the shaft $i^2$ to move toward the right hand of Fig. 3, and while the motion would be quite slight, still it would be sufficient to move with the shaft the collar 24, the ball bearings 25 and the collar 26 with its trunnions 27, and this longitudinal motion would be also imparted by the trunnions 27 to the arms $o^1$, moving the same and moving the rocker device of which the arms $o^1$ are a part on its shaft $m$ in one direction and correspondingly moving the arms $o^2$ which are part of the rocker device in the opposite direction; in other words,—referring to Fig. 5,—away from the collar $l^1$ easing the pressure of contact of the free ends of the arms $o^2$ against this collar and increasing the tension upon the spring $v^2$. This action will at once cause a momentary disengagement of the friction clutch device formed by the disks $c^1$ $c^2$ and the intervening friction disk 16, permitting the gear $h^5$ to turn freely on the shaft $k$ and the feed of the screw feed shaft $i^2$ to momentarily cease. This will give the saw an opportunity without any progressive movement to cut through the difficult or harder part of the metal. It is quite apparent that while this motion may be only slight, it may be repeated at short intervals and could be continuously repeated at short intervals so long as there was a difficult or hard part of the metal which would cause a backward movement of the screw feed shaft. Therefore as soon as the saw comes into the normal quality of the metal all these parts will resume their normal conditions by the expansion of the spring $v^2$ to its initial position and the saw be fed normally through the work. Were it otherwise than this, the saw might be injured if not broken by an effort to force it through the harder metal.

Referring now particularly to Figs. 8 and 9, which show another form of my invention,—the parts of which have equivalent actions and perform an equivalent function,—I provide a series of integral gears 38, 39, and 40 of different sizes all preferably formed as parts of a common hub 41 upon the shaft $k$ and which are loose on the shaft $k$, and I also provide a series of gears 42, 43, and 44 integral on a common hub and slidable on the shaft $d$ and held to the shaft against free rotation by a spline shown in Fig. 8. In this connection I employ a link 45 at one end connected by a pivot joint 46 to the surface of the hub carrying the gears 42, 43, and 44, and at the other end of the link 45 connected by a pivot 47 to a crank arm 48. This crank arm 48 and a lever 49 are connected to the same pivot or shaft while the free end of the lever 49 is adjustably connected to a segment 50. In this form of my invention the gears 38 and 42 may be in mesh as shown in Fig. 8, or the series of gears 42, 43 and 44 may be bodily moved by the lever device 49, crank arm 48 and the link 45 so as to bring the gear 43 into mesh with the gear 39, or outwardly to bring the gear 44 into mesh with the gear 40 so as to effect variations in the speed imparted to the screw feed shaft $i^2$ in an equivalent manner to the variations of speed produced by the devices shown in Figs. 2 and 5 and hereinbefore described.

In the form of my invention shown in Fig. 10, I have secured to the shaft $k$ an integral series of pulleys 51, 52 and 53 of varying sizes and on the shaft $d$ a series of pulleys 54, 55 and 56 which are keyed fast to the shaft $d$; the pulleys being connected together by a belt 57 which as shifted connects the pulleys 52 and 55, or 53 and 56, or 51 and 54. These pulleys will also effect an equal variation in the ratio of feed.

I claim as my invention:

1. In a metal sawing machine, the combination with the saw carriage, of a power shaft, a second shaft, gears connecting said shafts, a feed screw for said saw carriage, driving connections between one of said shafts and the feed screw for rotating the screw in one direction to advance the saw through the work, and connections between the other of said shafts and said feed screw for rotating the screw in the opposite direction to withdraw the saw from the work, said last-named connections including slip devices frictionally engaging one of said gears.

2. In a metal sawing machine, the combination with the saw carriage, of a power shaft, a second shaft, gears connecting said shafts, a feed screw for said saw carriage, driving connections between one of said shafts and the feed screw for rotating the screw in one direction to advance the saw through the work, and connections between the other of said shafts and said feed screw for rotating the screw in the opposite direction to withdraw the saw from the work, said last-named connections including a sprocket loosely mounted upon the power shaft, a chain passing around said sprocket, a sprocket mounted upon the feed-screw and around which said chain also passes, a washer interposed between the sprocket and gear on the power shaft and a friction ring also connected to said sprocket and spring-held with sufficient force to cause transmission by the sprocket to the gear under all ordinary circumstances.

3. In a metal sawing machine, the combination with the saw carriage, of a power shaft, a second shaft, gears connecting said shafts, a feed screw for said saw carriage, driving connections between one of said shafts and the feed screw for rotating the screw in one direction to advance the saw through the work, and connections between the other of said shafts and said feed screw for rotating the screw in the opposite direction to withdraw the saw from the work, said last-named connections including a sprocket loosely mounted upon the power shaft, a chain passing around said sprocket, a sprocket mounted upon the feed-screw and around which said chain also passes, a washer interposed between the sprocket and gear on the power shaft and coming at the back of the gear, a friction ring over-lapping the sprocket, bolts passing through the sprocket and through the friction ring and springs between the friction ring and heads of the bolts for pressing the friction ring with force against the sprocket so as to bind the sprocket to the device on the power shaft for all ordinary purposes of communicating power and rotation.

4. In a metal sawing machine, the combination with a power shaft $d$, screw feed shaft $i^2$, a shaft $k$ and driving connections between the shaft $i^2$ and shaft $k$, of a gear $h^5$ loosely mounted on the shaft $k$ and having a sleeve $h^6$, gearing connecting the shaft $d$ and gear $h^5$, a disk $c^1$ pinned to the outer end of the shaft $k$, a flanged disk $c^2$ surrounding the sleeve of the gear $h^5$ and a friction disk between the disks $c^1$ and $c^2$ and means for applying pressure against the gear $h^5$ and the disk $c^2$ so as to create sufficient friction to cause the rotation of the gear $h^5$ through the disk $c^1$ to rotate the shaft $k$.

5. In a metal sawing machine, the combination with a power shaft $d$, screw feed shaft $i^2$, a shaft $k$ and driving connections between shaft $i^2$ and shaft $k$, of a gear $h^5$ loosely mounted on the shaft $k$ and having a sleeve $h^6$, gearing connecting the shaft $d$ and gear $h^5$, a disk $c^1$ pinned to the outer end of the shaft $k$, a flanged disk $c^2$ surrounding the sleeve of the gear $h^5$ and a friction disk between the disks $c^1$ and $c^2$, a collar surrounding the shaft $k$, ball bearings intervening between said collar and the gear $h^5$ and adjustable spring actuated manually controlled devices bearing upon the collar and exerting a force to move the collar, the bearings and the gear longitudinally of the shaft to create a friction between the disks $c^2$ and $c^1$ to cause the shaft $k$ to rotate with the rotation of the gear $h^5$.

6. In a metal sawing machine, a housing $a^2$, a longitudinally movable screw feed shaft $i^2$ having a bearing therein, a vertical shaft $m$ mounted in said housing, a rocker comprising a tubular standard $o$, of arms $o^1$ and other arms $o^2$, a shaft $k$, means connecting the shaft $k$ and the screw feed shaft $i^2$ for the rotation of the latter, devices connected to the screw feed shaft and adapted to bear upon the free ends of the arms $o^1$, devices connected to the shaft $k$ providing for the rotation thereof and upon which the arms $o^2$ rest, whereby a longitudinal movement of the screw feed shaft will cause the rocker to release the devices upon the shaft $k$.

7. In a metal sawing machine, a housing $a^2$, a longitudinally movable screw feed shaft $i^2$ having a bearing therein, a vertical shaft $m$ mounted in said housing, a rocker comprising a tubular standard $o$, of arms $o^1$ and other arms $o^2$, a shaft $k$, means connecting the shaft $k$ and the screw feed shaft $i^2$ for the rotation of the latter, devices connected to the screw feed shaft and adapted to bear upon the free ends of the arms $o^1$, devices connected to the shaft $k$ providing for the rotation thereof and upon which the arms $o^2$ rest, whereby a longitudinal movement of the screw feed shaft will cause the rocker to release the devices upon the shaft $k$ and spring actuated manually controlled devices causing the free ends of the arms $o^2$ to bear with regulatable force upon the devices mounted upon the shaft $k$ for transmitting the rotation and power thereto.

8. In a metal sawing machine, the combination with a longitudinally movable screw feed shaft $i^2$, a power shaft $d$, a shaft $k$, means connecting the shaft $k$ with the shaft $i^2$ for its rotation and means connecting the power shaft $d$ with the shaft $k$ for its rotation including gearing and friction devices on the shaft $k$, of a collar 24 on the screw feed shaft and a shoulder produced by the reduction of the diameter thereof, a collar 26 with trunnions 27 and an intervening thrust bearing 25, a collar $l^1$, a shaft $m$ in the housing, and a rocker device mounted thereon having two pairs of arms extending in opposite directions, one pair adapted to bear upon the trunnions 27 and the other pair adapted to bear upon the collar $l^1$ and manually controlled spring actuated devices providing a constant regulatable tension against the pair of arms bearing upon the collar $l^1$ for producing a friction to drive the shaft $k$ from the power shaft $d$ and which devices are released by the longitudinal movement of the screw feed shaft under stress exerting a pressure on the arms and bearing upon the trunnions 27.

9. In a metal sawing machine, the combination with a longitudinally movable screw feed shaft $i^2$, a power shaft $d$, a shaft $k$, means connecting the shaft $k$ with the shaft $i^2$ for its rotation and means connecting the power shaft $d$ with the shaft $k$ for its rotation including gearing and friction devices on the shaft $k$, of a collar 24 on the screw feed shaft and a shoulder produced by the reduction of the diameter thereof, a collar 26 with trunnions 27 and an intervening thrust bearing 25, a collar $l^1$, a shaft $m$ in the housing and a rocker device mounted thereon having two pairs of arms extending in opposite directions, one pair adapted to bear upon the trunnions 27 and the other pair adapted to bear upon the collar $l^1$, a shaft $n$ also in trunnions in the housing, a manually actuated lever connected thereto, a fixed device for holding said lever as set and regulatable spring controlled devices extending between said shaft and arms of said rocker for applying a regulatable pressure.

10. In a metal sawing machine, the combination with a housing $a^2$, a shaft $m$ therein, a longitudinally movable screw shaft $i^2$, a shaft $k$ and devices mounted therein for communicating power and rotation, of a rocker comprising a tubular standard $o$, a pair of arms $o^1$ extending in one direction, a pair of arms $o^2$ extending in the opposite direction, a web $o^3$ between the arms $o^2$ and having a hole therein, a shaft $n$ also mounted in the housing, a fixed toothed edge segment $r$, a lever $s$ upon the shaft $n$ and a pawl spring actuated and carried by said lever and engaging the toothed edge of the segment, an arm $t$ upon the shaft $n$, a screw rod carried by said arm passing through the hole of the web $o^3$, a helical spring around said rod and a nut for applying pressure to said spring between the rod and said web, substantially as set forth.

Signed by me this 27th day of July, 1910.

CHAS. A. JUENGST.

Witnesses:
GEO. T. PINCKNEY,
BERTHA M. ALLEN.